United States Patent
Xu (10) Patent No.: US 11,126,732 B2
(45) Date of Patent: Sep. 21, 2021

(54) SECURITY OF AUTHENTICATION DATA ON MOBILE DEVICES

(71) Applicant: PAYPAL, INC., San Jose, CA (US)

(72) Inventor: Shipeng Xu, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 150 days.

(21) Appl. No.: 16/190,814

(22) Filed: Nov. 14, 2018

(65) Prior Publication Data
US 2020/0151341 A1    May 14, 2020

(51) Int. Cl.
G06F 21/60    (2013.01)
G06F 21/83    (2013.01)
G06Q 20/32    (2012.01)

(52) U.S. Cl.
CPC .............. *G06F 21/60* (2013.01); *G06F 21/83* (2013.01); *G06Q 20/3226* (2013.01)

(58) Field of Classification Search
CPC .......... G06F 21/60; G06F 21/83; G06F 21/31; G06Q 20/3226; G06Q 20/32; G06Q 20/4014; G07F 7/1025
See application file for complete search history.

(56) References Cited

U.S. PATENT DOCUMENTS

2010/0313125 A1    12/2010 Fleizach et al.
2015/0022439 A1*   1/2015 Alameh ................. G06F 3/017
                                                                                  345/156
2017/0039360 A1    2/2017 Hsu
2017/0361223 A1*   12/2017 Gohara ................. A63F 13/803
2019/0220588 A1*   7/2019 Agarwal ............. G06F 3/04886

FOREIGN PATENT DOCUMENTS

JP    2003/300015    10/2003

OTHER PUBLICATIONS

De Luca, et al. "Vibrapass: secure authentication based on shared lies", Proceedings of the 27th international conference on Human factors in computing systems—CHI 09, Apr. 2009 [retrieved Jan. 13, 2020], Retrieved from the Internet: <URL: https://dl.acm.org/doi/10.1145/1518701.1518840>; pp. 913-916.
Jeon, et al. "User-Adaptive Key Click Vibration on Virtual Keyboard", Hindawi, Mobile Information Systems, vol. 2018, Oct. 14, 2018, [retrieved Jan. 13, 2020], Retrieved from the Internet: <URL: https://new.hindawi.com/journals/misy/2018/6126140>; pp. 1-13.

* cited by examiner

*Primary Examiner* — Quazi Farooqui
(74) *Attorney, Agent, or Firm* — Haynes and Boone, LLP (57) ABSTRACT

Embodiments disclosed herein describe systems and methods for providing secure entry of authentication data on computing devices, such as mobile devices. In some embodiments, the systems and methods are implemented on a mobile device having one or more vibration motors configured to operate at one or more speeds, and a touch-sensitive display. The mobile device may determine that an application executing on the mobile device is requesting entry of authentication data from a user via the touch-sensitive display. The mobile device may detect entry of a first character of the authentication data from the user. During the entry of the first character of authentication data, the mobile device activates a vibration motor at a first speed.

20 Claims, 10 Drawing Sheets

SECURITY OF AUTHENTICATION DATA ON MOBILE DEVICES

BACKGROUND

Field

The present disclosure generally relates to authentication of mobile computing devices and more particularly to a system and method that prevents unauthorized detection of authentication data.

Related Art

More and more consumers are conducting transactions, such as searching for and purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment services provider such as, for example, PayPal, Inc. of San Jose, Calif. Such payment services providers can make transactions easier and safer for the parties involved. Purchasing with the assistance of a payment services provider from the convenience of virtually anywhere using a mobile device is one main reason why on-line and mobile purchases are growing very quickly.

On-line and mobile purchases often require that users enter authentication data, such as passwords and/or personal identification numbers (PINs). Other uses of mobile devices similarly require that users enter authentication data. Just as the number of on-line and mobile purchases is growing quickly, and the usage of mobile computing devices increases, the number of attempts by malicious actors to compromise users' authentication data that may result in, for example, fraudulent purchases not authorized by those users is likewise increasing.

Thus, there is a need for improved systems and methods for preventing users' authentication data from being compromised.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for providing secure entry of authentication data on computing devices, such as mobile devices. In some embodiments, the systems and methods are implemented on a mobile device having one or more vibration motors configured to operate at one or more speeds, and a touch-sensitive display. The mobile device may include instructions that, when executed, cause the mobile device to determine that an application executing on the mobile device is requesting entry of authentication data from a user via the touch-sensitive display. The mobile device may detect entry of a first character of the authentication data from the user, via the touch-sensitive display. During the entry of the first character of authentication data, the mobile device activates a vibration motor at a first speed. In some embodiments, the mobile device may then detect entry of a second character of the authentication data from the user via the touch-sensitive display. During entry of the second character of the authentication data, the mobile device may activate the vibration motor at a second speed different from the first speed. In some embodiments, the systems and methods are implemented as part of a mobile device operating system. In some embodiments, the systems and methods are implemented as part of a mobile device application.

As noted above, the number of attempts by malicious actors to compromise users' authentication data for unauthorized uses (e.g., fraudulent purchases not authorized by those users) is steadily increasing, and those malicious actors' techniques are steadily increasing in sophistication. Some malicious actors use malware or viruses to cause authentication data to be transmitted to the malicious actors instead of or in addition to their intended destination. However, malware and viruses can be detected by virus scanning or other software, and sometimes require that the user install malware or virus protection software.

Many mobile devices with touch-screen display devices include one or more sensor devices that detect movement or other data, such as accelerometers, barometers, gyroscopes, magnetometers, and other sensors. In normal use, such sensors may be used for various functionality, such as distance measuring, step tracking, rotation detection, and the like.

However, the data from such sensors can be analyzed and processed to reveal other information. For example, on mobile devices with touch-sensitive display devices used to enter data (including authentication data), entry of data on the touch-sensitive display device causes slight motion that can be detected by the accelerometer of the device. Researchers have found that machine learning techniques can be trained to derive the specific characters which were entered on the touch-sensitive display utilizing such data from sensors of the mobile device, which can include password data, personal identification numbers, other authentication data, credit card numbers, and the like. Therefore, systems and methods of the embodiments described herein cause the data detected by such sensors to be interfered with, such that the data detected by such sensors cannot be used to derive a user's authentication data.

Figure 1:
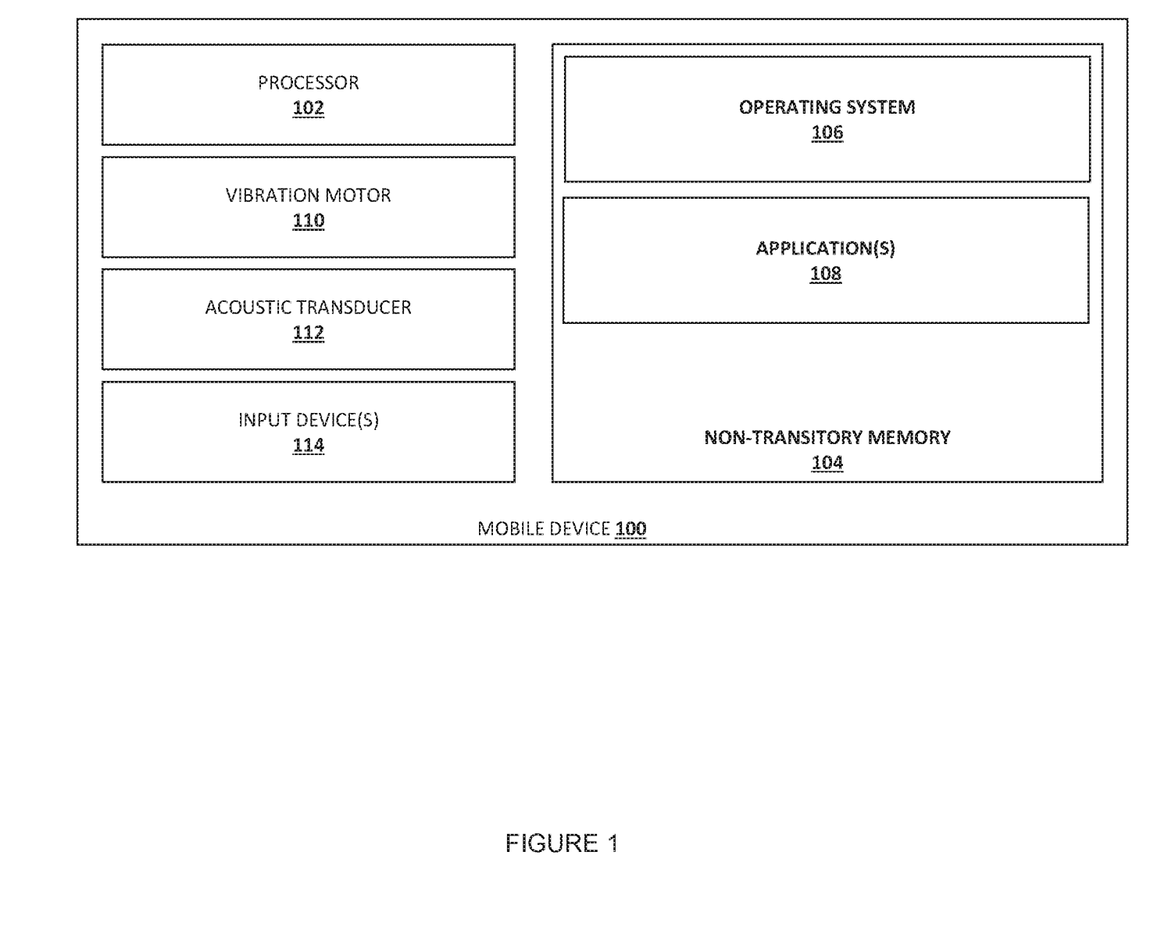
FIG. 1 is a schematic view illustrating an embodiment of a mobile device.

Referring now to FIG. 1, an embodiment of a mobile device 100 for providing enhanced security for entry of authentication data is described. Mobile device 100 includes a processor 102 in communication with memory 104, which may be a non-transitory memory. Memory 104 includes an operating system 106 which is responsible for the operation of mobile device 100, along with one or more applications 108. One such application 108 may be a payment application provided by a payment services provider, as will be further explained below. Mobile device 100 also includes one or more vibration motors 110 and acoustic transducers 112. Mobile device 100 also includes one or more input devices 114, which may include touch-sensitive display devices or physical input devices (e.g., a keyboard).

Figure 2:
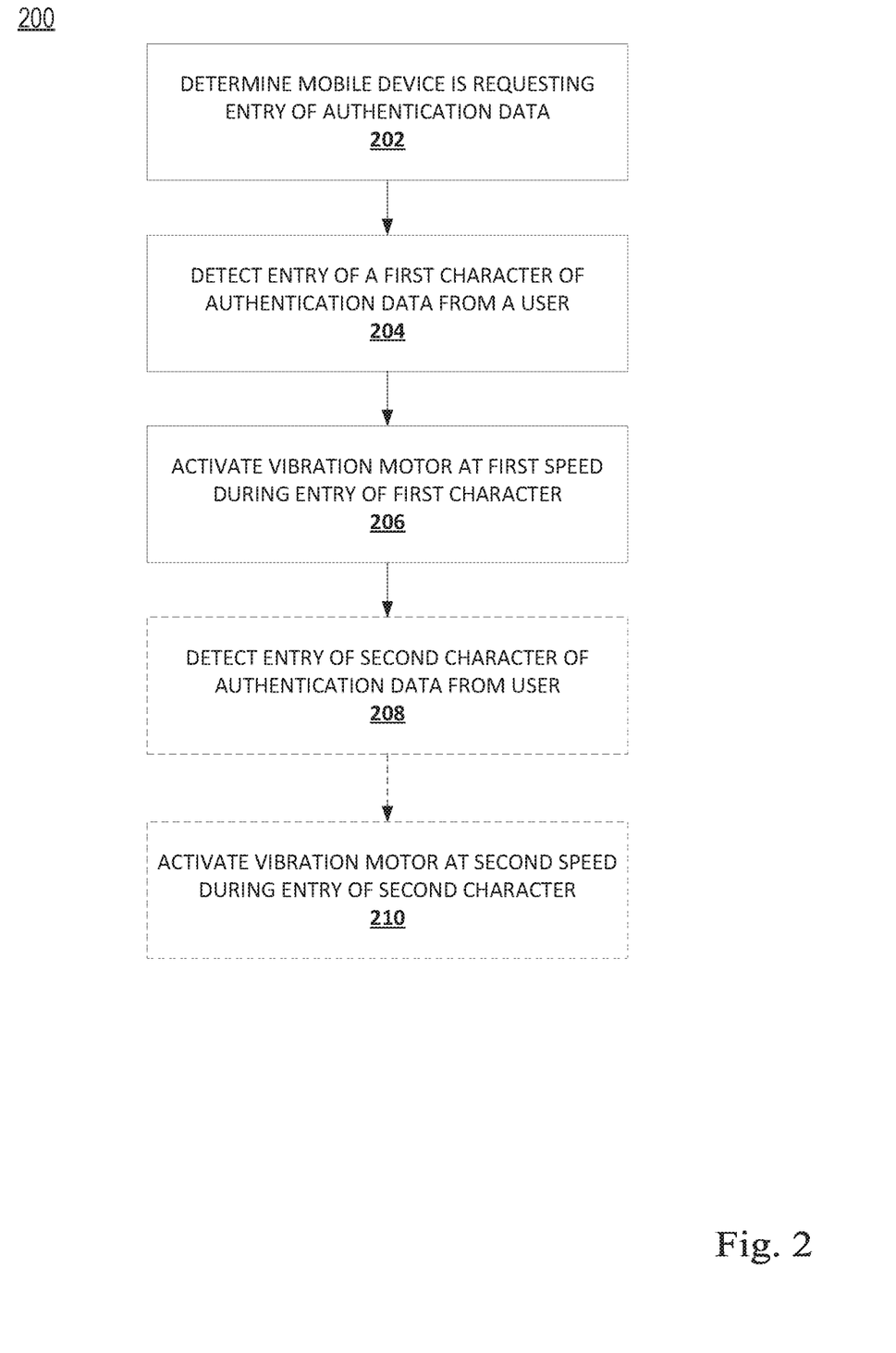
FIG. 2 is a flow chart illustrating an embodiment of a method for securing authentication data.

Referring now to FIG. 2, an embodiment of a method 200 for providing enhanced security for entry of authentication data is described. In the embodiments and examples discussed below, system functionality is realized by an application executing on a mobile device provided by a payment services provider that may provide a user various functionality that allows the user to save one or more payment sources, payment instruments or other methods of payment, make payments to online and/or offline (e.g., brick-and-mortar) merchants using those payment instrument(s), transfer money to other users using those payment instrument(s), and/or provide other functionality. For example, the system functionality and the steps of method 200 may be performed by a payment application, e.g., an application 108 executing on mobile device 100. However, the functionality described with respect to the embodiments disclosed herein is not limited to the aforementioned application provided by the payment services provider, and instead may be implemented in other applications provided by other service providers and uses such as, for example, a web browser, mapping applications, and/or other applications 108 executed by a mobile device having an input device such as a touch-sensitive display device. The functionality described with respect to the embodiments disclosed herein may also be implemented in a mobile device operating system, e.g., operating system 106. The functionality described with respect to the embodiments disclosed herein may also be implemented as a plug-in or add-on component (e.g., a data security component) to an application 108 or mobile device operating system 106.

Figure 3A:
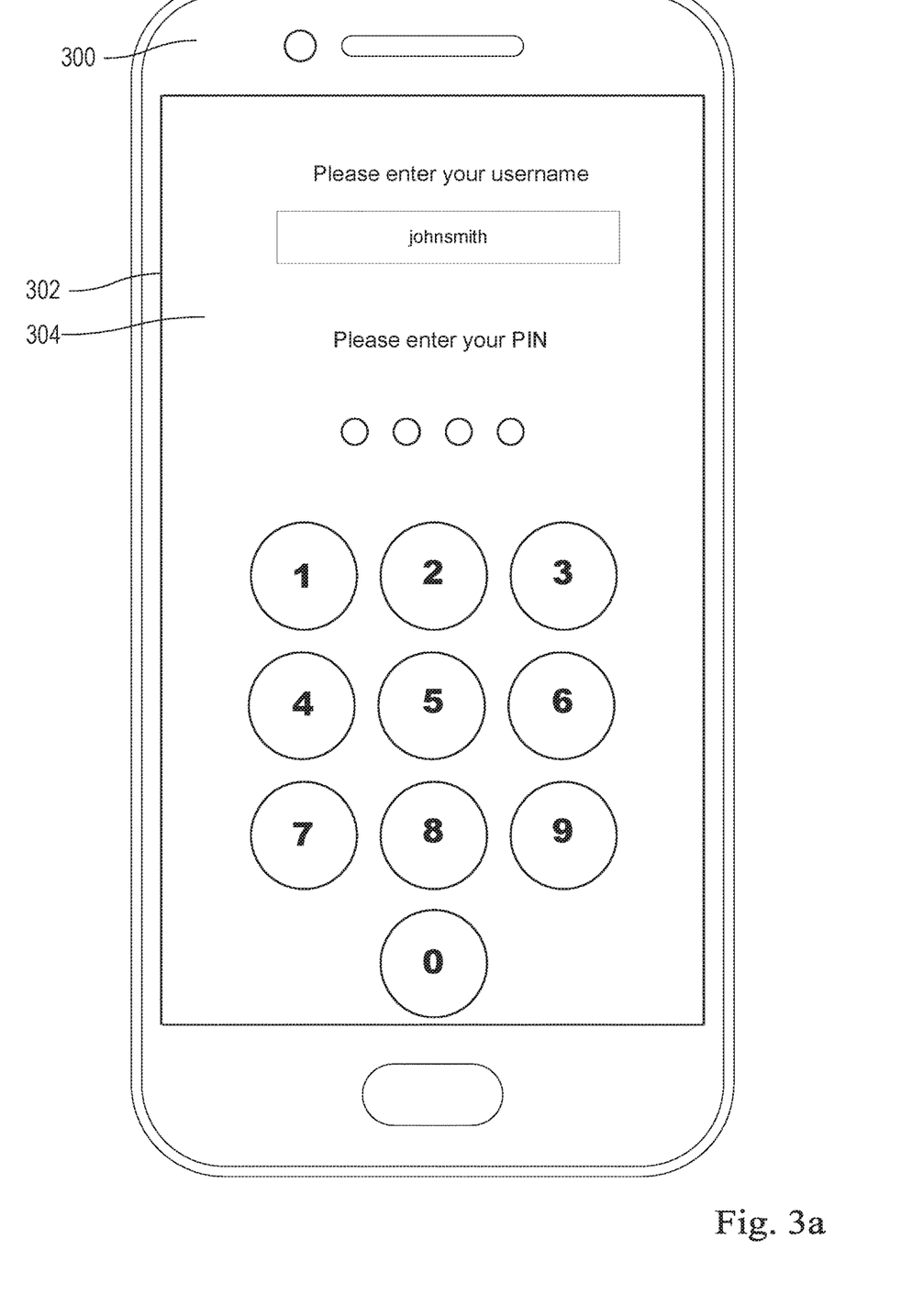
FIG. 3a is a front view illustrating an embodiment of a touch-sensitive display device on a mobile device displaying a mobile application requesting authentication information.

Referring first to FIG. 3a, a mobile device 300 includes a display 302 displaying an authentication screen 304 that provides for entry of authentication data to an application, which may be a payment application such as application 108. The authentication screen 304 may also be for the mobile device 300, where authentication is required to access applications stored on the device, which may require additional application-specific authentication data. Thus, in some embodiments, the authentication screen may be provided by a mobile device operating system, e.g., operating system 106. As discussed above the payment application may be provided by a payment services provider, such as PayPal Inc. of San Jose, Calif., and the user associated with the mobile device 300 may have a payment account with the payment services provider that allows the payer to access one or more financial accounts or payment sources for making payments to merchants or other users (e.g., credit financial accounts, banking financial accounts, virtual currency financial accounts, etc.) upon entry of authentication data. The display 302 is a touch-sensitive or gesture-detecting display device, and may include multi-touch display device functionality that is capable of detecting multiple inputs at once from a user.

The method 200 begins at block 202 where it is determined that the mobile device is requesting authentication data from a user via the touch-sensitive display. In some embodiments, the determination may be performed by the application 108 executing on the mobile device 100 in response to a determination that the application requires authentication data. In some embodiments, the determination may be performed by an operating system 106 executing on the mobile device. In some embodiments, the determination may be responsive to a cursor's focus within a form field calling for entry of authentication data. For example, if the request for authentication data is within a web page, some embodiments may analyze the markup language representation used to render the web page (e.g., the hypertext markup language or HTML) to determine that one or more form fields on the web page request authentication data. In some embodiments, natural language processing may be performed on the text displayed on the touch-sensitive display and used to recognize text that calls for entry of authentication data. For example, natural language processing techniques may determine that the text "password" or "Enter your password" appears on the display. In some embodiments, calls to operations or instructions provided by an application programming interface ("API") may be analyzed to determine that an application is calling for entry of authentication data. In some embodiments, an application 108 and operating system 106 may operate in conjunction and communicate to determine that the mobile device is requesting authentication data from a user. In some embodiments, the authentication data is a password, a personal information number (PIN), a combination of a username and password, or any other authentication information, such as an e-mail address (which may serve as a username), secret code, or other such authentication information. In some embodiments, the authentication information is received using the touch-sensitive display device displaying a software number entry keyboard displayed on the screen of the mobile device to enter in a personal identification number. In some embodiments, the authentication information is received using the touch-sensitive display device displaying a traditional QWERTY or other software keyboard displayed on the screen of the mobile device to enter in a password.

To view and utilize functionality of the payment application, a user typically must enter or provide authentication data to the payment application. Thus, method 200 proceeds to block 204. At block 204, entry of a first character of the authentication data from the user, via the touch-sensitive display, is detected. In some embodiments, the detection is performed based on the user pressing a finger to the touch-sensitive display to enter a first character of the authentication data. Thus, the detection may be based in part on signals received from a digitizer of the touch-sensitive display device. In some embodiments, the detection may be performed using a camera of the mobile device; for example, a front-facing camera may be able to detect a proximity of a finger to the touch-sensitive display device. In some embodiments, if the mobile device has a physical keyboard or other input device, the detection may be based in part on signals received from the hardware of the keyboard communicated to an operating system and/or an application such as the payment application.

Method 200 then proceeds to block 206. At block 206, a vibration motor of the mobile device is activated during or after the detected entry of the first character of the authentication data from the user. That is, at substantially the same time as the user is entering the first character of authentication data using the touch-sensitive display or immediately or shortly afterwards, the vibration motor of the mobile device is activated. In some embodiments, the vibration motor is activated within milliseconds of or after the entry of the first character of the authentication data from the user. In some embodiments, the vibration motor may be activated prior to the entry of the first character of the authentication data. For example, the vibration motor may be activated after block 202, where it is determined that the mobile device is requesting authentication data from a user via the touch-sensitive display. In some implementations, activating the vibration motor after block 202, e.g., as soon as the mobile device requests entry of authentication data, may increase the security of the user's authentication data.

In some embodiments, systems and methods described herein may predict the expected entry of the first character of the authentication data from the user, and activate the vibration motor at or before the expected entry of the first character of authentication data. For example, the amount of time between display of a screen requesting authentication data (e.g., screen 304) and entry of a first character of authentication data may be measured, and such measurements may be aggregated over a given amount of time. In some embodiments, machine learning techniques may be used to analyze the aggregated time measurements to determine an expected amount of time between display of the screen and entry of the first character, and the expected amount of time may be used to activate a vibration motor at substantially the same time as or right before the predicted entry of the first character of authentication data. Further, as described above, in some embodiments, the vibration motor may be activated before the entry of the first character of the authentication data from the user; for example, the vibration motor may be activated upon determining that the mobile device is requesting authentication data from a user via the display.

Figure 3B:
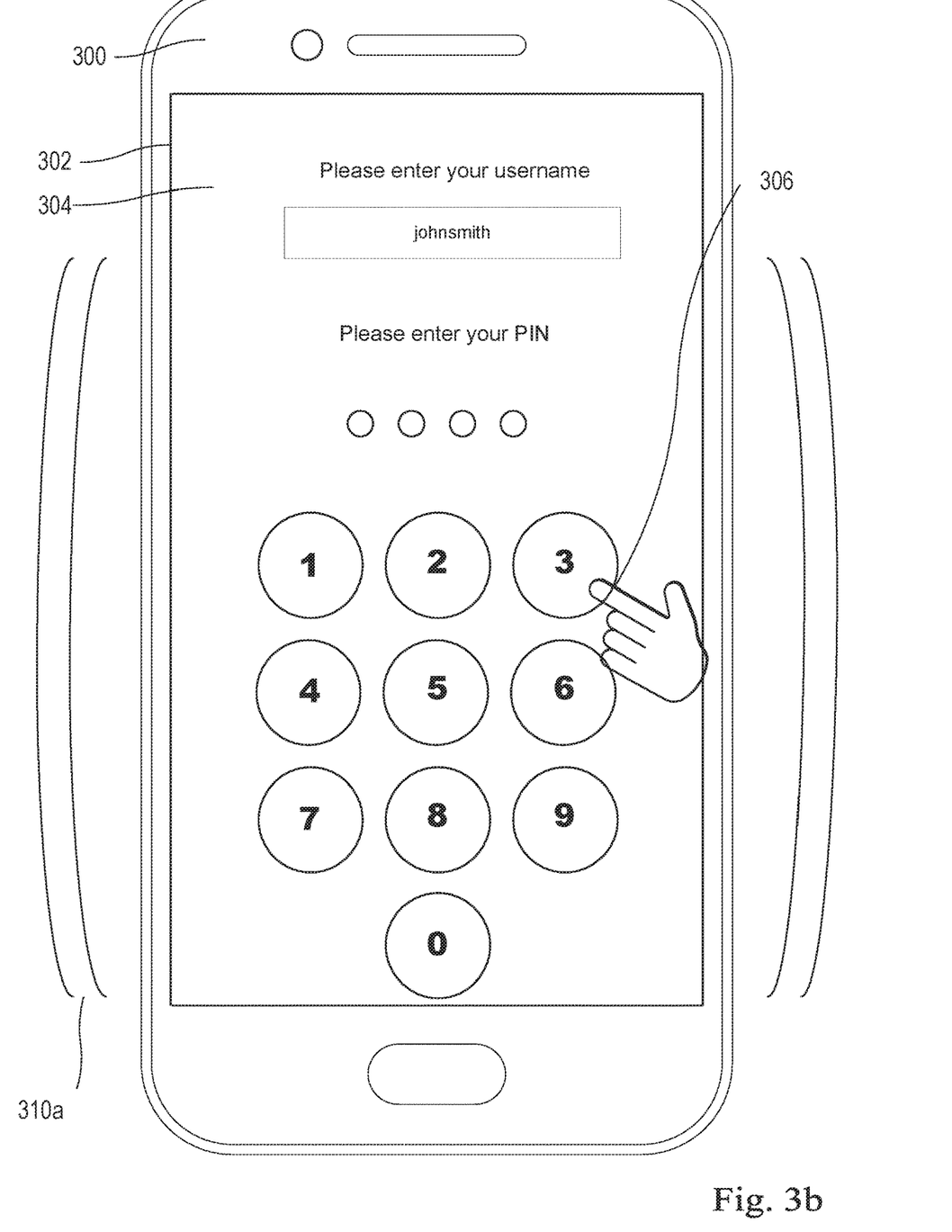
FIG. 3b is an additional front view illustrating an embodiment of a touch-sensitive display device on a mobile device displaying a mobile application requesting authentication information.

Referring to FIG. 3b, the screen 304 displays a prompt for a user to enter a personal identification number. As shown in FIG. 3b, when the user's finger 306 enters the first character of the authentication data (in the example of FIG. 3b, the number 3), the vibration motor of the device is activated at a particular speed, as indicated by the lines 310a depicting vibration.

By activating the vibration motor at a speed prior to or during the entry of the first character of authentication data by the user, data from an accelerometer or other sensor of the mobile device, even if compromised, cannot be effectively used to derive the user's authentication data, because the vibration motor sufficiently interferes with or makes the sensor data deviate from "clean" data that could be used to derive the user's authentication data. However, as malicious actors' techniques further advance, some embodiments employ additional techniques to further cause the sensor data to be unusable to compromise authentication data. For embodiments where the vibration is used after entry of the first authentication letter/number/symbol (collectively referred to as "character"), security is also improved because even if the first character is obtained by a fraudster, subsequent characters entered by the user may not be, such that a full authentication credential is not obtained. In one embodiment, when the vibration is used may be dependent on the length of the authentication credential. For example, if the authentication credential is short (e.g., four characters), the vibration may start before or during the first character entry, while if the authentication is long (e.g., more than four characters), the vibration may start after entry of the first character. The length of the authentication credential may be communicated to the mobile device through the application or system requesting the authentication for user access.

Method 200 may continue to block 208, where entry of a second character of the authentication data from the user via the touch-sensitive display is detected. As discussed above, detecting entry of a character of authentication data may be accomplished in multiple ways, for example by prediction data, a digitizer of the touch-sensitive display device, a camera, other sensors of the mobile device, or a combination thereof.

Based on the detection of entry of the second character of authentication data, method 200 proceeds to block 210, where a vibration motor of the mobile device is activated at a second speed. In some embodiments, the second speed is different from the first. In some embodiments, the vibration motor may be a different motor than used previously with reference to block 206. In some embodiments, the speed at which the vibration motor is activated is chosen with reference to a vibration database that maps specific types of authentication or portions of credentials to a particular speed. For example, the vibration database may specify that odd numbers of characters cause vibration at a first speed, and even numbers of characters cause vibration at a second speed. Likewise, the vibration database may specify that every first and fourth character are mapped to a particular speed, and every second and fifth character are mapped to a different speed. In some embodiments, the vibration database can be updated or changed periodically or at random. In some embodiments, the vibration motor is deactivated between the detected entry of the first character and the detected entry of the second character. In some embodiments, the vibration motor remains activated at the first speed after the detected entry of the first character, and changes to the second speed upon detection of entry of the second character of authentication data.

Figure 3C:
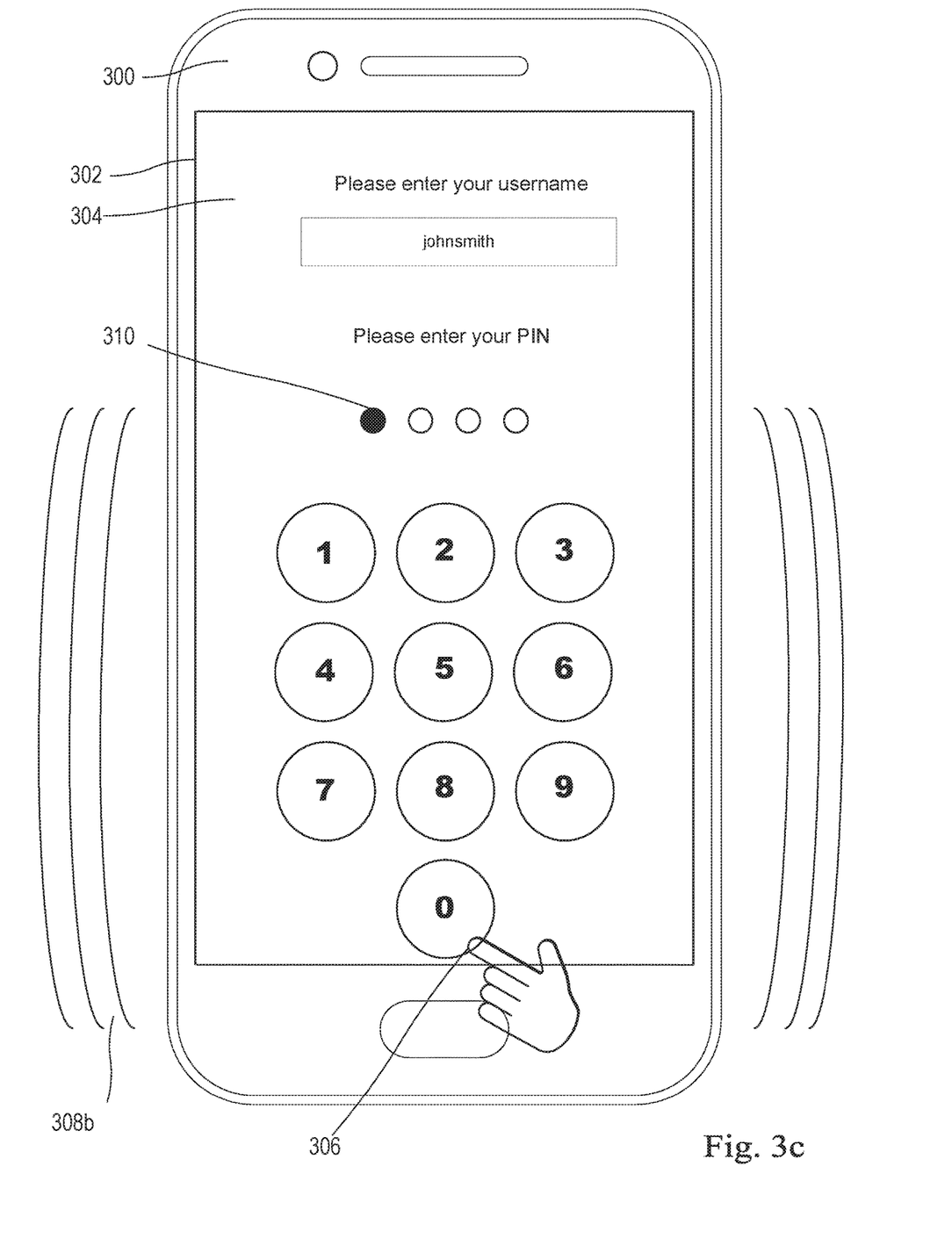
FIG. 3c is an additional front view illustrating an embodiment of a touch-sensitive display device on a mobile device displaying a mobile application requesting authentication information.

Thus, referring to FIG. 3c, the screen 306 continues to display a prompt for a user to enter a personal identification number. As shown in FIG. 3c, the user has already entered in a first character of the personal identification number (as depicted by the solid circle 310). When the user's finger 306 enters the second character of the authentication data (in the example of FIG. 3c, the number 0), the vibration motor of the device is activated at a particular speed different than that depicted in FIG. 3b, as indicated by the lines 308b depicting vibration. In different embodiments, the vibration speed may be changed right after a character is entered and/or during a character entry.

In this way, malicious actors that have determined how to filter data that has been made noisy by the vibration motor being activated at the first speed will face additional difficulties once they encounter data that has been made noisy by a different level.

In some embodiments, blocks 204-210, or subsets thereof, may be repeated for each character of authentication data that is entered by the user. Thus, entry of each character of authentication data may be associated with an activation of a vibration motor at a given speed, such that accelerometer or other sensor data from the mobile device cannot be used to derive any character of authentication data. In some embodiments, the vibration motor of the device is activated throughout the entry of authentication data by the user, and the speed at which the vibration motor is activated varies randomly throughout the entry of the authentication data by the user. In some embodiments, the vibration motor of the device is activated randomly throughout a portion of the entry of authentication data by the user, or throughout the entire entry of authentication data by the user. That is, the vibration motor of the device may be activated at random speeds throughout the entry of the authentication data by the user without specific reference to the characters entered by the user, such that the speed at which the vibration motor is activated may change between the entry of a first and second character, from a first speed, to a second speed, and even to a third and subsequent speeds. As noted above, the vibration motor of the device may be activated at random speeds before the first character of the authentication data is entered. In some embodiments, the vibration motor may be activated at a particular pattern; for example, the vibration motor may be activated for every other character of the authentication data, or every two out of five characters, etc.

In some embodiments, the payment application or operating system of the mobile device 100 may detect that the entry of the authentication data is complete, and turn off the vibration motor. For example, the entry of the authentication data may be determined to be complete in response to the user selecting a particular button displayed on the display device. The user's selection of the button may be detected using the digitizer of the touch-sensitive display device and natural language processing or analysis of a web page to determine that a "Submit" or "Login" button is present on the display.

Figure 3D:
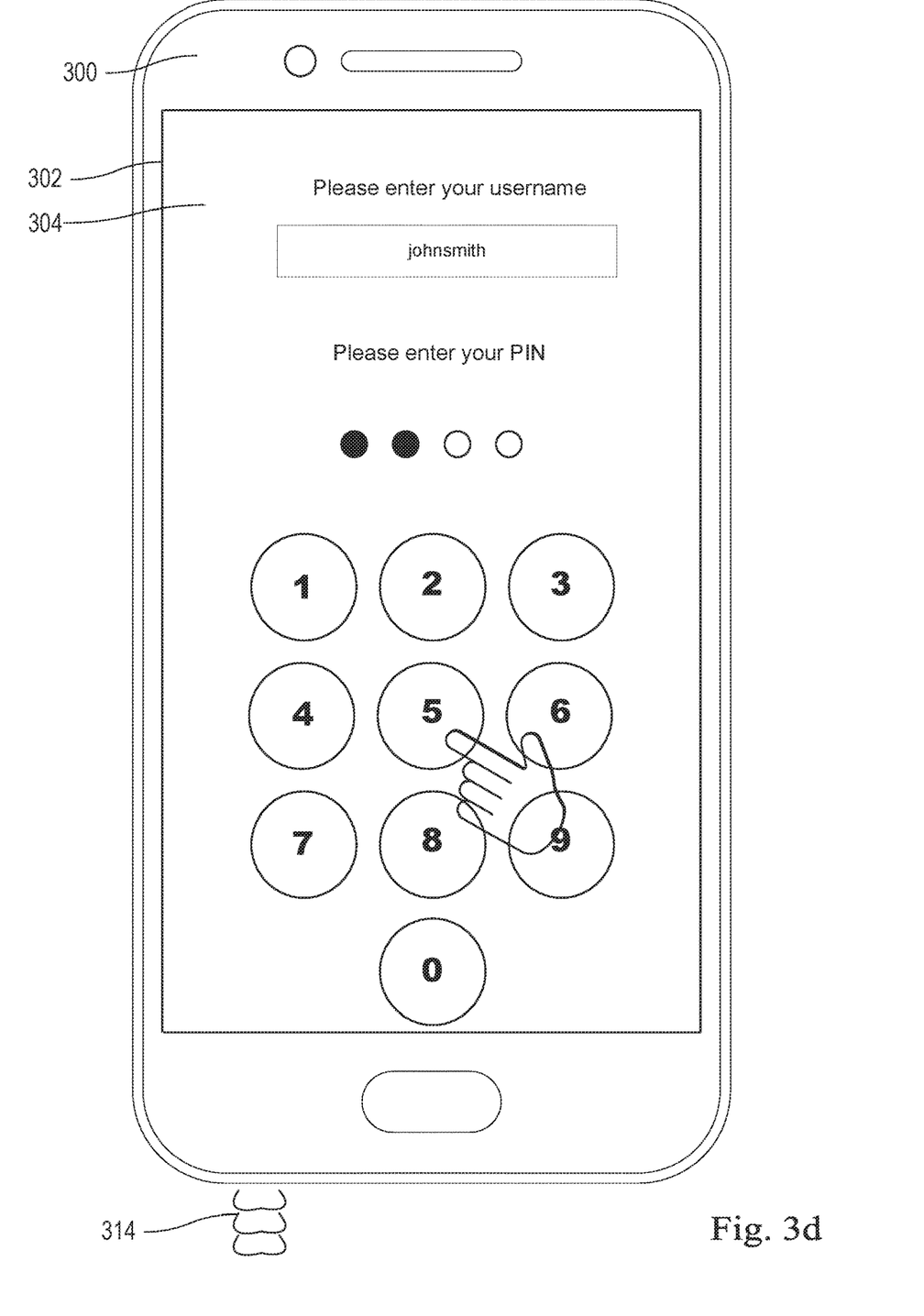
FIG. 3d is an additional front view illustrating an embodiment of a touch-sensitive display device on a mobile device displaying a mobile application requesting authentication information.

In some embodiments, other techniques may be employed to vary the sensor data detected by an accelerometer or other sensor. For example, activating a vibration motor, while increasing security, may not be desirable in all circumstances. Some users may find the additional vibration to be distracting, and activating the vibration motor may make it difficult for certain users (e.g., the elderly, or those with motion-affecting disabilities) to enter in their authentication data. Thus, in some embodiments, other actions are taken to disrupt sensor data. For example, during entry of a character of authentication data, an acoustic transducer of the mobile device (e.g., a coil for a speaker) may be activated at a given frequency and amplitude that can be detected by an accelerometer, which interferes with the accelerometer data during the entry of the character such that the data cannot be used to compromise the user's authentication data. Thus, referring to FIG. 3d, a speaker of the mobile device 300 may emit sounds (as depicted by the lines 314) during the entry of the third character of authentication data. In some embodiments, the acoustic transducer is activated at a frequency that is not within a human ear's hearing range (e.g., lower than 20 hertz or higher than 20,000 hertz), such that the user does not know the mobile device is taking such actions, but the mobile device is (silently) increasing the user's security. As with the vibration embodiments described above, the sound can be emitted and/or changed at different stages of the authentication data entry. In further embodiments, both vibration and sound may be used in various combinations during authentication data entry for even more security.

In some embodiments, aspects of the systems and methods described herein may be user-configurable. For example, users may be provided with one or more menu options within an application executing on the mobile device or within the operating system, by which the user can configure various options, such as whether the vibration motor is activated at different speeds during the authentication data, or the maximum level at which the vibration motor is activated. Likewise, users may be provided with a menu option by which the user can configure how many different speeds to activate vibration motors. Similarly, if the acoustic transducer techniques are used, users may be provided with menu options to cause the mobile device to activate both the acoustic transducer and the vibration motor, or options to set the frequency at which the acoustic transducer is activated. For example, some users may find comfort in knowing that the acoustic transducer is activated during the entry of authentication data, and may set options to provide an audible tone or a pleasing tone.

In some embodiments, machine learning techniques may be applied to sensor data as a self-test of the efficacy of such systems and methods. For example, machine learning techniques implemented within software executing on the mobile device 100 may attempt to derive authentication data based on training a model with aggregated sensor data. If the machine learning techniques are successful in deriving the authentication data, an application or operating system executing on the mobile device may recognize that the currently implemented technique of interfering with sensor data is no longer effective, and may cause the application or operating system to cause further interference with the sensor data (e.g., by varying the speed of a vibration motor randomly throughout the entry of authentication data, or by additionally activating a transducer in addition to the vibration motor).

Thus, systems and methods have been described that provide for more secure entry of authentication data for a mobile device having a touch-sensitive display. The systems and methods may determine that the mobile device is requesting entry of authentication data from a user via the touch-sensitive display. The mobile device may detect entry of a character of the authentication data from the user via the touch-sensitive display. The mobile device may then in response activate a vibration motor at a specific speed during the detected entry of the first character of the authentication data from the user. Such systems and methods protect the user's authentication data from being compromised by an attacker who obtains sensor data of the user's mobile device and attempts to process that sensor data to determine the user's authentication data, because the sensor data detects the vibration along with any motion of the device caused by the entry of the authentication data, but the attackers are unable to reliably filter out the movement caused by the vibration motor.

Figure 4:
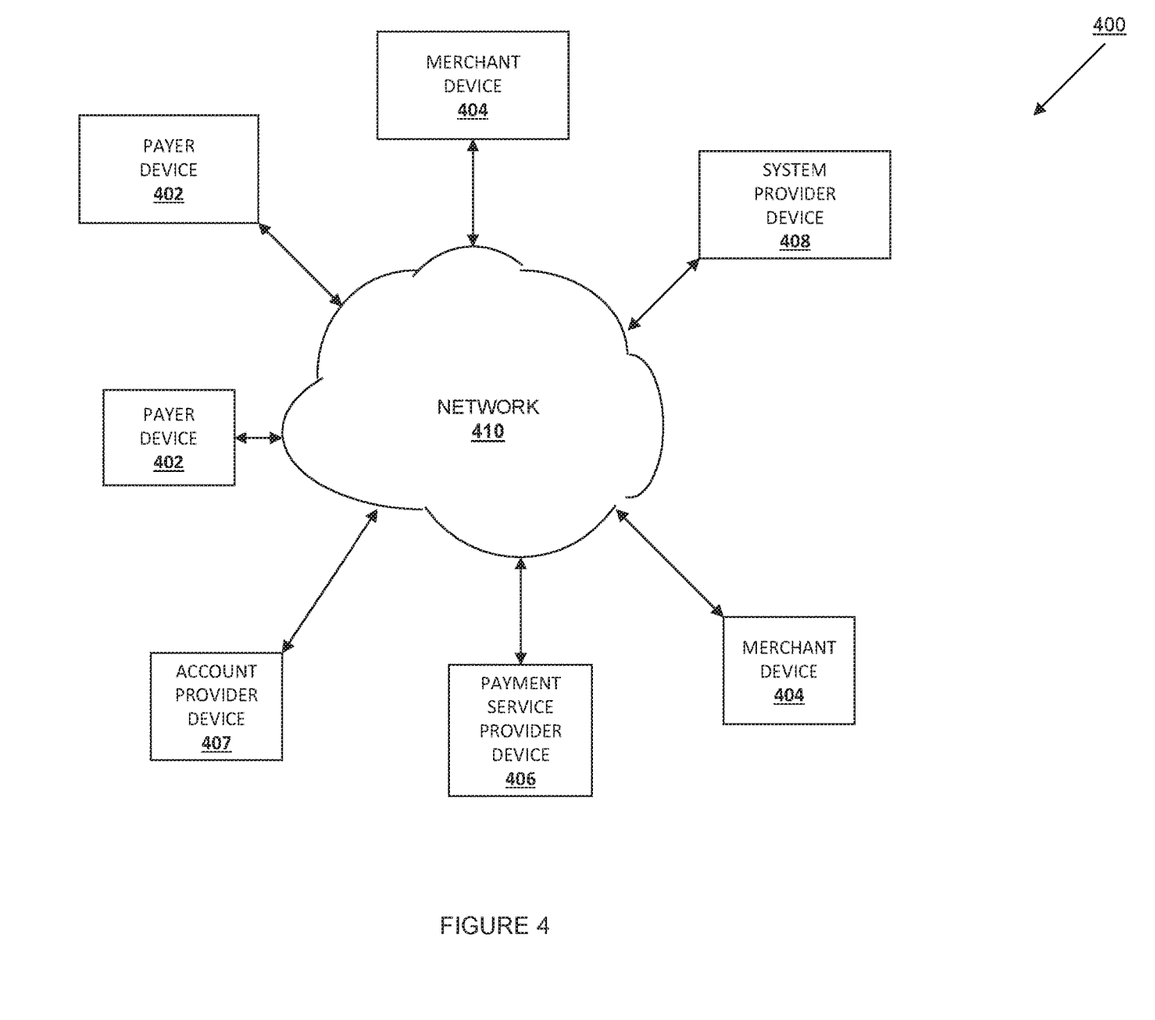
FIG. 4 is a schematic view illustrating an embodiment of a networked system.

Referring now to FIG. 4, an embodiment of a network-based system 400 for implementing one or more processes described herein is illustrated. As shown, network-based system 400 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 4 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 400 illustrated in FIG. 4 includes a plurality of payer devices 402, a plurality of merchant devices 404, a payment services provider device 406, an account provider device 407, and/or a system provider device 408, in communication over a network 410. Any of the payer devices 402 may be the mobile device 300 operated by the users, discussed above. The merchant devices 404 may be merchant devices discussed above that can be accessed by users to purchase products, and may be operated by various merchants. The payment services provider device 406 may be the payment services provider devices discussed above and may be operated by a payment services provider such as, for example, PayPal Inc. of San Jose, Calif. The account provider devices 407 may be operated by account providers such as, for example, credit card account providers, bank account providers, savings account providers, and a variety of other account providers known in the art. The system provider device 408 may be operated by system providers.

The payer devices 402, merchant devices 404, payment services provider device 406, account provider device 408, and/or system provider device 408 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 400, and/or accessible over the network 410.

The network 410 may be implemented as a single network or a combination of multiple networks. For example, in various embodiments, the network 410 may include the Internet and/or one or more intranets, landline networks, wireless networks, and/or other appropriate types of networks.

The payer device 402 may be implemented using any appropriate combination of hardware and/or software configured for wired and/or wireless communication over network 410. For example, in some embodiments, the payer device 402 may be implemented as a personal computer of a user in communication with the Internet. In other embodiments, the payer device 402 may be a smart phone, personal digital assistant (PDA), laptop computer, and/or other types of computing devices.

The payer device 402 may include one or more browser applications which may be used, for example, to provide a convenient interface to permit the payer to browse information available over the network 410. For example, in some embodiments, the browser application may be implemented as a web browser configured to view information available over the Internet.

The payer device 402 may also include one or more toolbar applications which may be used, for example, to provide user-side processing for performing desired tasks in response to operations selected by the payer. In some embodiments, the toolbar application may display a user interface in connection with the browser application.

The payer device 402 may further include other applications as may be desired in particular embodiments to provide desired features to the payer device 402. In particular, the other applications may include a payment application for payments assisted by a payment services provider through the payment services provider device 406. The other applications may also include security applications for implementing user-side security features, programmatic user applications for interfacing with appropriate application programming interfaces (APIs) over the network 410, or other types of applications. Email and/or text applications may also be included, which allow the payer to send and receive emails and/or text messages through the network 410. The payer device 402 includes one or more user and/or device identifiers which may be implemented, for example, as operating system registry entries, cookies associated with the browser application, identifiers associated with hardware of the payer device 402, or other appropriate identifiers, such as a phone number. In some embodiments, the user identifier may be used by the payment services provider device 406 and/or account provider device 407 to associate the user with a particular account as further described herein.

The merchant device 404 may be maintained, for example, by a conventional or on-line merchant, conventional or digital goods seller, individual seller, and/or application developer offering various products and/or services in exchange for payment to be received conventionally or over the network 410. In this regard, the merchant device 404 may include a database identifying available products and/or services (e.g., collectively referred to as items) which may be made available for viewing and purchase by the payer.

The merchant device 404 also includes a checkout application which may be configured to facilitate the purchase by the payer of items. The checkout application may be configured to accept payment information from the user through the payer device 402, the account provider through the account provider device 407, and/or from the payment services provider through the payment services provider device 406 over the network 410.

Figure 5:
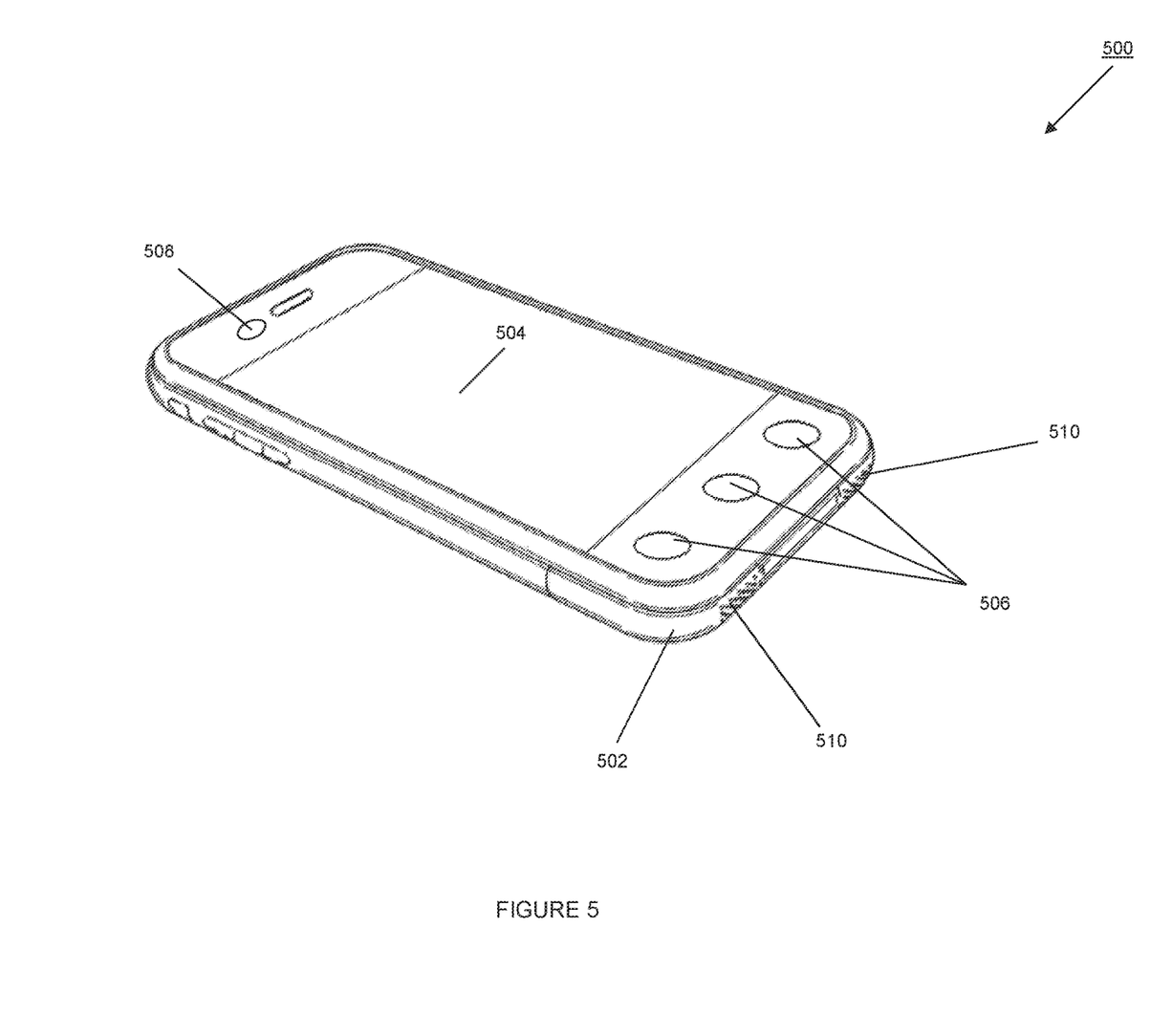
FIG. 5 is a perspective view illustrating an embodiment of a mobile device.

Referring now to FIG. 5, an embodiment of a mobile device 500 is illustrated. The mobile device 500 may be the mobile devices 100, 300 and/or payer device 402. The mobile device 500 includes a chassis 502 having a display 504 and an input device including the display 504 and a plurality of input buttons 506. The mobile device 500 further includes a camera 508 and one or more audio input/output devices (e.g., microphones, speakers) 510. One of skill in the art will recognize that the mobile device 500 is a portable or mobile phone including a touch screen input device and a plurality of input buttons that allow the functionality discussed above with reference to the method 200. However, a variety of other portable/mobile payer devices and/or desktop payer devices may be used in the method 200 without departing from the scope of the present disclosure.

Figure 6:
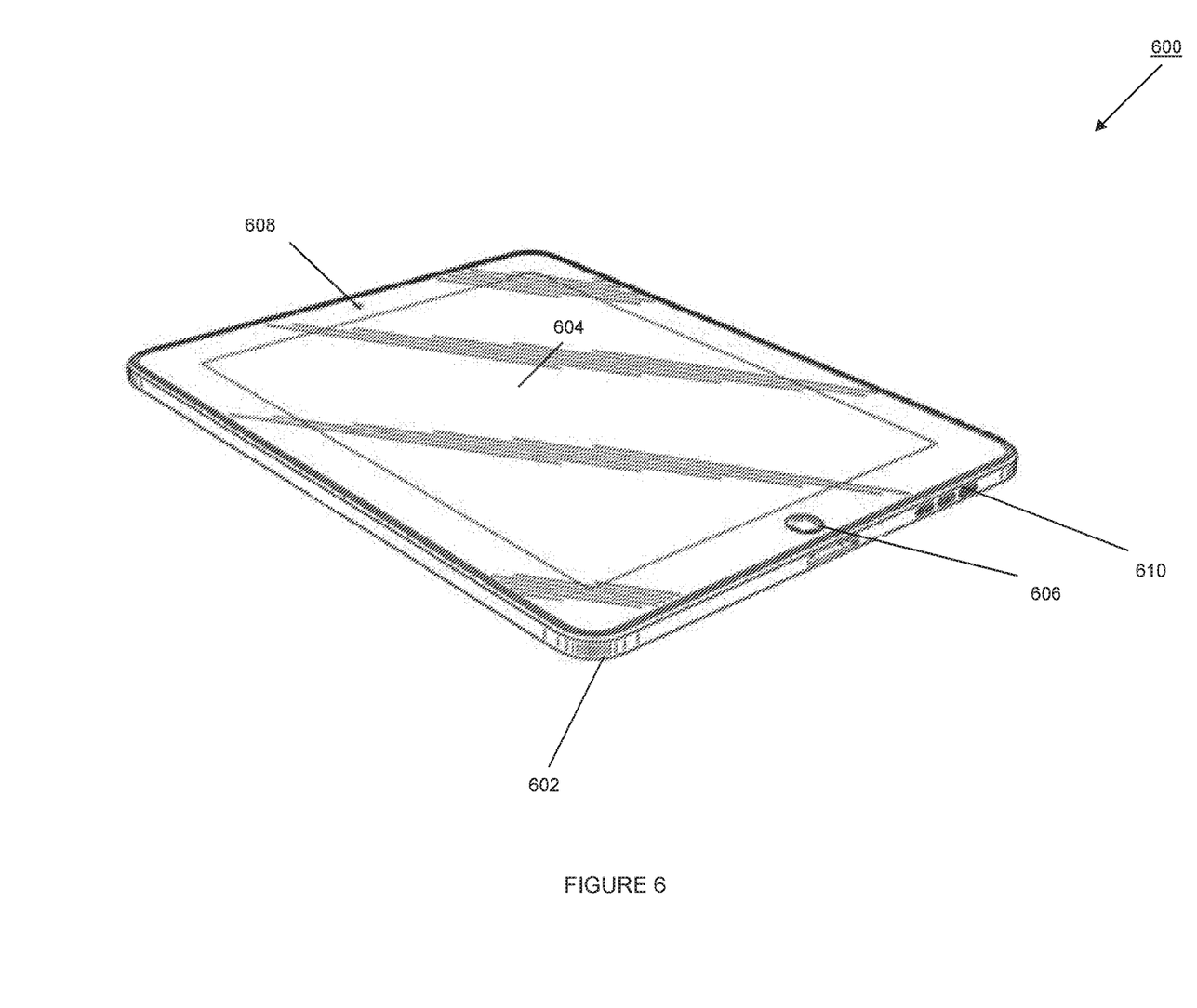
FIG. 6 is a perspective view illustrating a further embodiment of a mobile device.

Referring now to FIG. 6, a further embodiment of a mobile device 600 is illustrated. The mobile device 600 may be the mobile device 100, 300 and/or payer device 402. The mobile device 600 includes a chassis 602 having a display 604 and an input device including the display 604. The mobile device 600 may also include an input button 606 and one or more audio input/output device 608 (e.g. microphones, speakers). One of skill in the art will recognize that the mobile device 600 is a portable or mobile tablet device including a touch screen input device and a plurality of input buttons that allow the functionality discussed above with reference to the method 200. However, a variety of other portable/mobile payer devices and/or desktop payer devices may be used in the method 200 without departing from the scope of the present disclosure.

Figure 7:
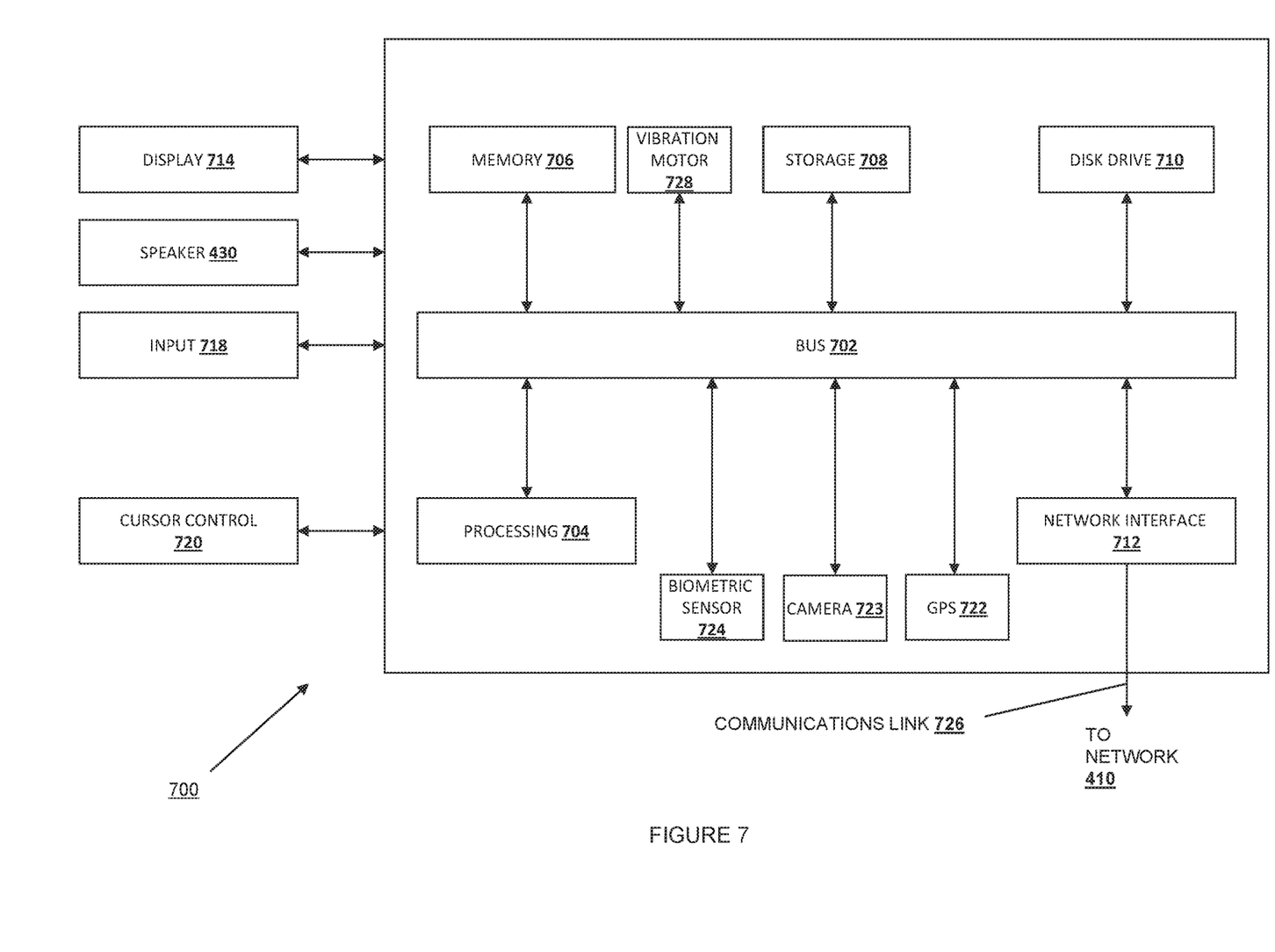
FIG. 7 is a schematic view illustrating an embodiment of a computer system.

Referring now to FIG. 7, an embodiment of a computer system 700 suitable for implementing, for example, the mobile device 100, 300, the payer device 402, the mobile device 500, the mobile device 600, the merchant devices 404, the payment services provider device 406, the account provider device 407, and/or the system provider device 408, is illustrated. It should be appreciated that other devices utilized by payers, merchants, payment services providers, account providers, and system providers in the system discussed above may be implemented as the computer system 700 in a manner as follows.

In accordance with various embodiments of the present disclosure, computer system 700, such as a computer and/or a network server, includes a bus 702 or other communication mechanism for communicating information, which interconnects subsystems and components, such as a processing component 704 (e.g., processor, micro-controller, digital signal processor (DSP), etc.), a system memory component 706 (e.g., RAM), a static storage component 708 (e.g., ROM), a disk drive component 710 (e.g., magnetic or optical), a network interface component 712 (e.g., modem or Ethernet card), a display component 714 (e.g., CRT, LCD, touch-sensitive display device, etc.), an input component 718 (e.g., keyboard, keypad, virtual keyboard, touch-sensitive display device), a cursor control component 720 (e.g., mouse, pointer, or trackball), a location determination component 722 (e.g., a Global Positioning System (GPS) device as illustrated, a cell tower triangulation device, a Wi-Fi triangulation device, a Bluetooth-based location device, and/or a variety of other location determination devices known in the art), and/or a camera device 723. The computer system 700 may also include a biometric sensor component 724, which may include a fingerprint sensor with associated software, facial recognition hardware and/or software, retinal detection hardware and/or software, or audio analysis hardware and/or software. The computer system 700 may also include a vibration motor 728. The computer system 700 may also include one or more speakers 730 or other acoustic transducers. In one implementation, the disk drive component 710 may comprise a database having one or more disk drive components.

In accordance with embodiments of the present disclosure, the computer system 700 performs specific operations by the processor 704 executing one or more sequences of instructions contained in the memory component 706, such as described herein with respect to the mobile devices 100, 300, 500, 600, payer devices 402, the merchant device(s) 404, the payment services provider device 406, the account provider device(s) 407, and/or the system provider device 408. Such instructions may be read into the system memory component 706 from another computer readable medium, such as the static storage component 708 or the disk drive component 710. In other embodiments, hard-wired circuitry may be used in place of or in combination with software instructions to implement the present disclosure.

Logic may be encoded in a computer readable medium, which may refer to any medium that participates in providing instructions to the processor 704 for execution. Such a medium may take many forms, including but not limited to, non-volatile media, volatile media, and transmission media. In some embodiments, the computer readable medium is non-transitory. In various implementations, non-volatile media includes optical or magnetic disks, such as the disk drive component 710, volatile media includes dynamic memory, such as the system memory component 706, and transmission media includes coaxial cables, copper wire, and fiber optics, including wires that comprise the bus 702. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In some embodiments, the computer readable media is non-transitory.

In various embodiments of the present disclosure, execution of instruction sequences to practice the present disclosure may be performed by the computer system 700. In various other embodiments of the present disclosure, a plurality of the computer systems 700 coupled by a communication link 726 to the network 310 (e.g., such as a LAN, WLAN, PTSN, and/or various other wired or wireless networks, including telecommunications, mobile, and cellular phone networks) may perform instruction sequences to practice the present disclosure in coordination with one another.

The computer system 700 may transmit and receive messages, data, information and instructions, including one or more programs (i.e., application code) through the communication link 726 and the network interface component 712. The network interface component 712 may include an antenna, either separate or integrated, to enable transmission and reception via the communication link 726. Received program code may be executed by processor 704 as received and/or stored in disk drive component 710 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:
1. A mobile device, comprising:
   a non-transitory memory;
   one or more vibration motors configured to vibrate at a plurality of speeds;

a touch-sensitive display; and one or more hardware processors coupled to the non-transitory memory, the one or more vibration motors, and the touch-sensitive display, wherein the one or more processors are configured to execute instructions to cause the mobile device to perform operations comprising:

detecting, at the mobile device, a request for entry of authentication data;

detecting, by the one or more hardware processors, an entry of a first character of the authentication data by the user via the touch-sensitive display; and     in response to detecting the entry of the first character, activating the vibration motor at a first speed of the plurality of speeds;

predicting, by the one or more hardware processors, a time corresponding to an entry of a second character of the authentication data by the user via the touch-sensitive display; and     activating, at a second speed of the plurality of speeds, the vibration motor prior to the predicted time.

2. The mobile device of claim 1, wherein the operations further comprise causing a sound to be emitted from the mobile device before the user completes entry of the authentication data.

3. The mobile device of claim 1, wherein the authentication data comprises a password, a personal identification number, or a username.

4. The mobile device of claim 1, further comprising an acoustic transducer, and wherein the operations further comprise activating the acoustic transducer during or after the detected entry of the character of the authentication data from the user.

5. The mobile device of claim 1, wherein the non-transitory memory stores prediction data associated with the user of the mobile device, and wherein activating the vibration motor prior to the predicted time further comprises activating the vibration motor based at least in part on the prediction data.

6. The mobile device of claim 1, wherein determining the mobile device is requesting entry of authentication data from a user via the touch-sensitive display is based, at least in part, on a focus of a cursor displayed on the touch-sensitive display.

7. The mobile device of claim 1, wherein the operations further comprise:

activating, at random speeds of the plurality of speeds, the vibration motor during or after entry of subsequent characters of the authentication data from the user, wherein the subsequent characters are subsequent to the first character and the second character.

8. A computer-implemented method, comprising:

determining, by one or more hardware processors of a mobile device, that the mobile device is requesting entry of authentication data from a user via a touch-sensitive display of the mobile device;

predicting, by the one or more hardware processors, a time when the user may enter a first character of the authentication data via the touch-sensitive display; and     activating, by the one or more hardware processors and at a first speed, a vibration motor of the mobile device before the predicted time;

detecting, by the one or more hardware processors, an entry of a second character of the authentication data from the user via the touch-sensitive display; and     activating, at a second speed, the vibration motor during the detected entry of the second character of the authentication data from the user.

9. The method of claim 8, wherein the authentication data comprises a password, a personal identification number, or a username.

10. The method of claim 8, further comprising:

detecting, by the one or more hardware processors, an entry of the first character of the authentication data from the user via the touch-sensitive display; and     activating, at a third speed, the vibration motor after the detected entry of the first character of the authentication data from the user.

11. The method of claim 8, further comprising causing a sound to be emitted from the mobile device before the user completes entry of the authentication data.

12. The method of claim 8, wherein the predicting is based at least in part on stored prediction data for the user.

13. The method of claim 8, wherein determining that the mobile device is requesting entry of authentication data from a user via the touch-sensitive display is based, at least in part, on a focus of a cursor displayed on the touch-sensitive display.

14. The method of claim 8, further comprising activating, at random speeds, the vibration motor during entry of subsequent characters of the authentication data from the user.

15. A non-transitory machine-readable medium having stored thereon machine-readable instructions which, when executed by one or more processors, cause a machine to perform operations comprising:

determining, by a mobile device, that the mobile device is requesting entry of authentication data from a user via a touch-sensitive display of the mobile device;

detecting an entry of a character of the authentication data from the user via the touch-sensitive display; and     activating, based on the user, a data security component during or after the detected entry of the character of the authentication data from the user;

predicting a time corresponding to an entry of a subsequent character of the authentication data from the user via the touch-sensitive display; and     activating, at a first speed of a plurality of speeds, the vibration motor prior to the predicted time.

16. The non-transitory machine-readable medium of claim 15, wherein the data security component activates a vibration motor of the mobile device at a second speed of a plurality of speeds.

17. The non-transitory machine-readable medium of claim 16, wherein the operations further comprise causing a sound to be emitted from the mobile device before the user completes entry of the authentication data.

18. The non-transitory machine-readable medium of claim 16, wherein the activating the vibration motor, at the second speed of the plurality of speeds, is done during the detected entry of the character of the authentication data from the user.

19. The non-transitory machine-readable medium of claim 15, wherein the data security component activates the acoustic transducer of the mobile device.

20. The non-transitory machine-readable medium of claim 15, wherein the authentication data comprises a password, a personal identification number, and a username.

* * * * *